United States Patent
Matsuoka (10) Patent No.: US 11,131,373 B2
(45) Date of Patent: Sep. 28, 2021

(54) TORQUE CONVERTER

(71) Applicant: EXEDY Corporation, Neyagawa (JP)

(72) Inventor: Yoshihiro Matsuoka, Neyagawa (JP)

(73) Assignee: EXEDY CORPORATION, Neyagawa (JP)

( * ) Notice: Subject to any disclaimer, the term of this patent is extended or adjusted under 35 U.S.C. 154(b) by 0 days.

(21) Appl. No.: 16/807,458

(22) Filed: Mar. 3, 2020

(65) Prior Publication Data

US 2020/0325971 A1    Oct. 15, 2020

(30) Foreign Application Priority Data

Apr. 10, 2019 (JP) .............................. JP2019-074899

(51) Int. Cl.
*F16H 45/02* (2006.01)
*B60K 1/00* (2006.01)
*F16H 41/24* (2006.01)

(52) U.S. Cl.
CPC ................. *F16H 45/02* (2013.01); *B60K 1/00* (2013.01); *F16H 2041/246* (2013.01); *F16H 2045/0205* (2013.01); *F16H 2045/0278* (2013.01)

(58) Field of Classification Search
CPC .................................. F16H 45/00–2045/0294
See application file for complete search history.

(56) References Cited

U.S. PATENT DOCUMENTS

| | | | |
|---|---|---|---|
| 2,762,196 A * | 9/1956 | Ulleryfrede | F16H 61/60 60/345 |
| 2,947,395 A * | 8/1960 | Ulleryfrede | F16D 41/07 192/45.2 |
| 4,226,309 A * | 10/1980 | Siliberschlag | F16D 43/18 192/105 CE |
| 6,254,507 B1 * | 7/2001 | Downs | B60K 6/383 477/4 |
| 2003/0047401 A1 | 3/2003 | Muramatsu | |
| 2004/0130225 A1 * | 7/2004 | Mencher | B60K 6/485 310/78 |
| 2018/0172129 A1 | 6/2018 | Depraete et al. | |

FOREIGN PATENT DOCUMENTS

| | | | | |
|---|---|---|---|---|
| DE | 102010012965 A1 | | 9/2011 | |
| DE | 102012017545 A1 | * | 8/2013 | ............. B60K 17/26 |
| JP | 2016-142398 A | | 8/2016 | |
| WO | WO-2013020682 A1 | * | 2/2013 | ............. F16H 45/02 |

OTHER PUBLICATIONS

Extended European Search Report of the corresponding European Patent Application No. 20167917.2, dated Sep. 28, 2020, 7 pp.

* cited by examiner

*Primary Examiner* — Ernesto A Suarez
*Assistant Examiner* — James J Taylor, II
(74) *Attorney, Agent, or Firm* — United IP Counselors, LLC (57) ABSTRACT

A torque converter is disclosed. The torque converter includes a cover, an impeller, a turbine, a stator, and a first one-way clutch. A torque outputted from a prime mover is inputted to the cover. The impeller is unitarily rotated with the cover. The turbine is opposed to the impeller. The stator is disposed between the impeller and the turbine. The first one-way clutch is configured to make the cover rotatable relative to the turbine in a forward rotational direction. The first one-way clutch is further configured to rotate the cover unitarily with the turbine in a reverse rotational direction.

4 Claims, 10 Drawing Sheets

TORQUE CONVERTER

CROSS-REFERENCE TO RELATED APPLICATIONS

This application claims priority to Japanese Patent Application No. 2019-074899, filed on Apr. 10, 2019. The contents of that application are incorporated by reference herein in their entirety.

TECHNICAL FIELD

The present invention relates to a torque converter.

BACKGROUND ART

Torque converters exert a torque amplifying action. For example, Japan Laid-open Patent Application Publication No. 2016-142398 discloses a torque converter including a cover, an impeller, a turbine, a stator and a one-way clutch. When a torque, outputted from a prime mover, is inputted to the cover, the torque is transmitted to the impeller and the turbine and is then outputted therefrom. The stator herein returns hydraulic oil, flowing thereto from the turbine, to the impeller, whereby the torque is amplified. The stator is attached to a stationary shaft through the one-way clutch.

The torque converter configured as described above has been demanded to enable efficient torque transmission. In view of this, it is an object of the present invention to enable efficient torque transmission.

BRIEF SUMMARY

A torque converter according to an aspect of the present invention includes a cover, an impeller, a turbine, a stator and a first one-way clutch. The cover is a component to which a torque outputted from a prime mover is inputted. The impeller is unitarily rotated with the cover. The turbine is opposed to the impeller. The stator is disposed between the impeller and the turbine. The first one-way clutch makes the cover rotatable relative to the turbine in a forward rotational direction. Besides, the first one-way clutch rotates the cover unitarily with the turbine in a reverse rotational direction.

According to this configuration, efficient torque transmission is enabled when the torque converter is attached to a drive source such as a reversely rotatable motor. Specifically, when rotation occurs in the forward rotational direction, the first one-way clutch makes the cover rotatable relative to the turbine. In other words, the first one-way clutch does not transmit a torque, oriented in the forward rotational direction, from the cover therethrough to the turbine. Because of this, the torque, oriented in the forward rotational direction, is sequentially transmitted from the cover through the impeller to the turbine. It should be noted that the torque, oriented in the forward rotational direction, is a torque directed to be amplified by an action of the stator.

By contrast, when rotation occurs in the reverse rotational direction, the first one-way clutch rotates the cover unitarily with the turbine. In other words, the first one-way clutch transmits a torque, oriented in the reverse rotational direction, from the cover therethrough to the turbine. Because of this, the torque can be outputted from the cover to the turbine without through a hydraulic fluid. It should be noted that in the reverse rotational direction, the torque converter does not exert a torque amplifying action. Because of this, efficient torque transmission is enabled by omitting a needless torque transmission path.

Preferably, the torque converter further includes a second one-way clutch. The second one-way clutch makes the stator rotatable in the forward rotational direction. Besides, the second one-way clutch makes the stator non-rotatable in the reverse rotational direction.

Preferably, the torque converter further includes an elastic member. The elastic member transmits the torque outputted from the cover therethrough to the first one-way clutch in the reverse rotational direction. According to this configuration, the torque, outputted from the cover, is transmitted to the first one-way clutch and the turbine through the elastic member. Hence, massive and sudden torque transmission can be eased.

Preferably, the torque converter further includes an elastic member. The elastic member transmits the torque outputted from the first one-way clutch therethrough to the turbine in the reverse rotational direction. According to this configuration, the torque, transmitted from the cover to the first one-way clutch through the elastic member, is transmitted to the turbine. Hence, massive and sudden torque transmission can be eased.

Overall, according to the present invention, efficient torque transmission is enabled.

DETAILED DESCRIPTION

Figure 1:
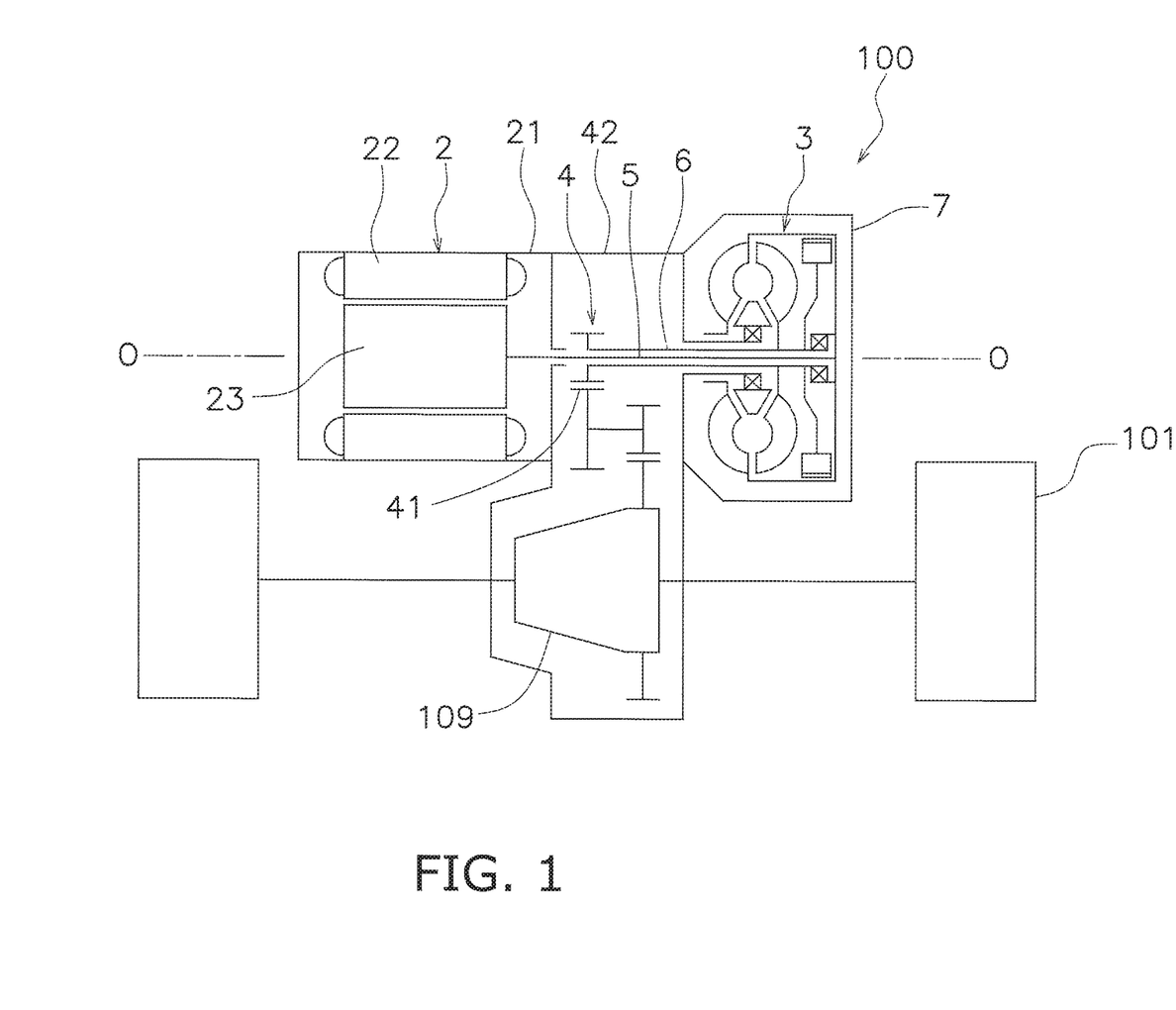
FIG. 1 is a schematic diagram of a drive unit.
Figure 2:
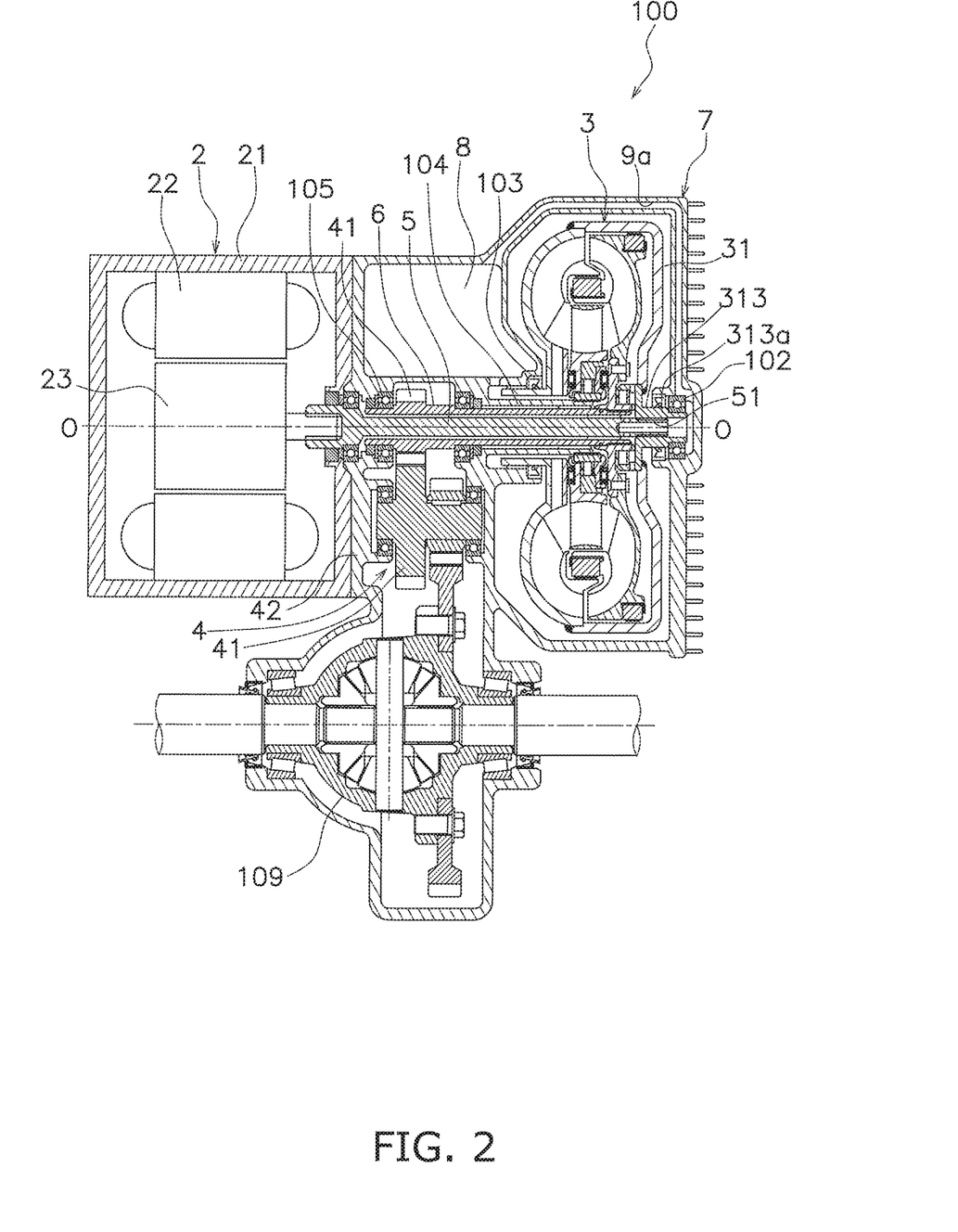
FIG. 2 is a cross-sectional view of the drive unit.

A preferred embodiment of a drive unit including a torque converter according to the present invention will be hereinafter explained with reference to drawings. FIG. 1 is a schematic diagram of the drive unit according to the present preferred embodiment, whereas FIG. 2 is a cross-sectional view of the drive unit according to the present preferred embodiment. It should be noted that in the following explanation, the term "axial direction" refers to an extending direction of a rotational axis O of a prime mover 2 and a torque converter 3. On the other hand, the term "circumferential direction" refers to a circumferential direction of an imaginary circle about the rotational axis O, whereas the term "radial direction" refers to a radial direction of the imaginary circle about the rotational axis O. Moreover, the term "forward rotation" refers to rotation in forward movement of a vehicle, whereas the term "reverse rotation" refers to rotation in backward movement of the vehicle.

[Drive Unit 100]

As shown in FIGS. 1 and 2, a drive unit 100 includes the prime mover 2, the torque converter 3, a reducer 4 (exemplary power transmission mechanism), an input shaft 5, an output shaft 6, a torque converter casing 7, a hydraulic fluid sump 8 and a first cooling flow pathway 9*a*. The drive unit 100 is installed in, for instance, an electric car. The drive unit 100 transmits a torque, outputted from the prime mover 2, to drive wheels 101. It should be noted that the torque converter 3, the torque converter casing 7, the hydraulic fluid sump 8 and the first cooling flow pathway 9*a* will be collectively referred to as a torque converter unit.

<Prime Mover 2>

The prime mover 2 includes a prime mover casing 21, a stator 22 and a rotor 23. In the present preferred embodiment, the prime mover 2 is a motor. Detailedly, the prime mover 2 is a so-called inner rotor motor. The prime mover casing 21 is fixed to a vehicle body frame or so forth and is non-rotatable.

The stator 22 is fixed to the inner peripheral surface of the prime mover casing 21. The stator 22 is non-rotatable. The rotor 23 is rotated about the rotational axis O. The rotor 23 is disposed radially inside the stator 22.

<Torque Converter 3>

The torque converter 3 is disposed at an interval from the prime mover 2 in the axial direction. The reducer 4 is disposed between the torque converter 3 and the prime mover 2. The rotational axis O of the torque converter 3 is substantially matched with that of the prime mover 2. The torque converter 3 is a device to which the torque, outputted from the prime mover 2, is inputted. Additionally, the torque converter 3 amplifies the torque inputted thereto from the prime mover 2, and outputs the amplified torque to the reducer 4.

Figure 3:
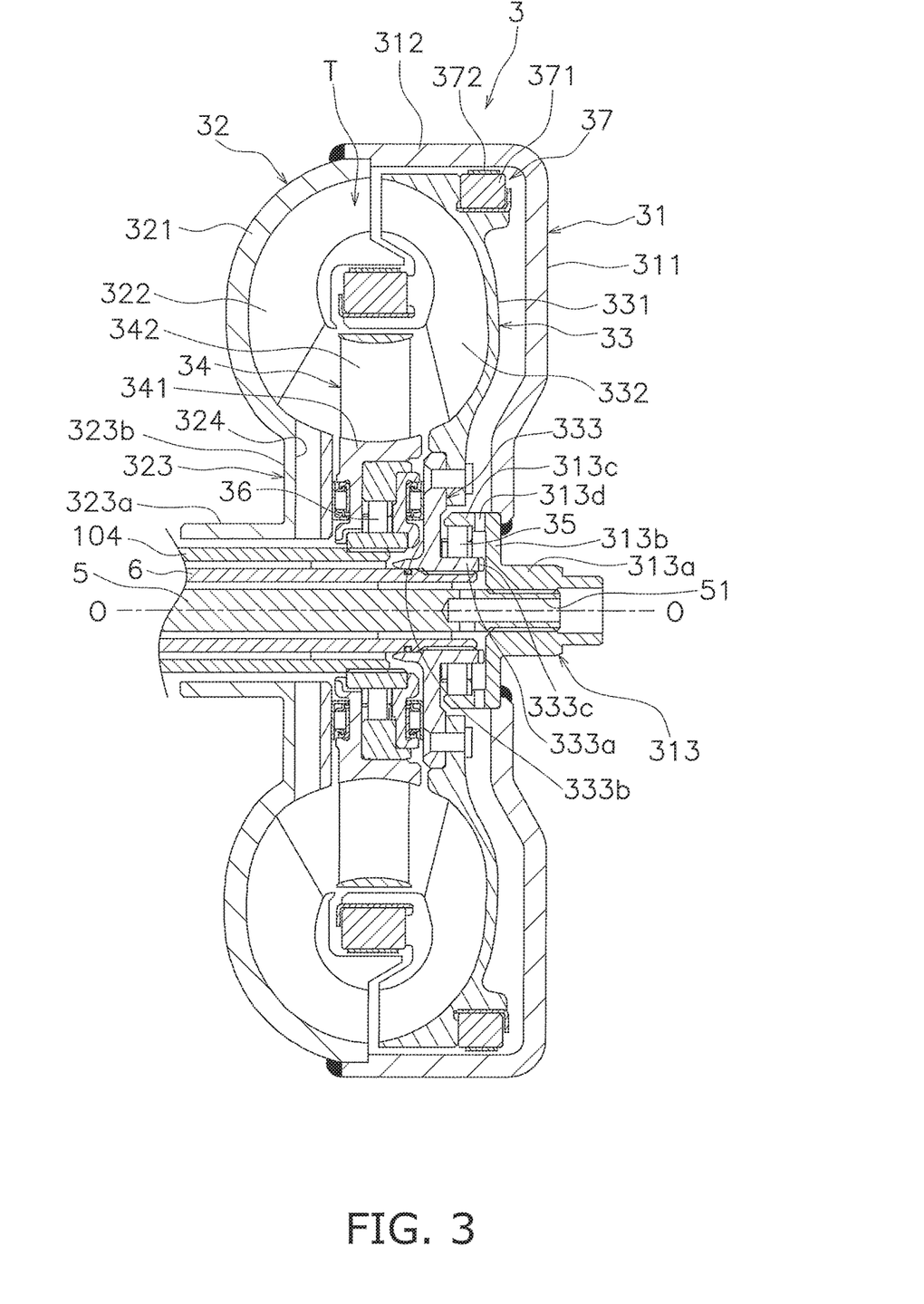
FIG. 3 is a cross-sectional view of a torque converter.

As shown in FIG. 3, the torque converter 3 includes a cover 31, an impeller 32, a turbine 33, a stator 34, a first one-way clutch 35 and a second one-way clutch 36. Besides, the torque converter 3 further includes a centrifugal clutch 37.

The torque converter 3 is disposed such that the impeller 32 faces the prime mover 2 (the left side in FIG. 3) whereas the cover 31 faces opposite to the prime mover 2 (the right side in FIG. 3). The torque converter 3 is accommodated in the interior of the torque converter casing 7. Hydraulic fluid is supplied to the interior of the torque converter 3. The hydraulic fluid is, for instance, hydraulic oil.

The cover 31 is a component to which the torque, outputted from the prime mover 2, is inputted. The cover 31 is rotated by the torque inputted thereto from the prime mover 2. The cover 31 is fixed to the input shaft 5 extending from the prime mover 2. For example, the cover 31 includes a spline hole to which the input shaft 5 is spline-coupled. Because of this, the cover 31 is unitarily rotated with the input shaft 5. The cover 31 is disposed to cover the turbine 33.

The cover 31 includes a disc portion 311, a cylindrical portion 312 and a cover hub 313. The disc portion 311 includes an opening in the middle thereof. The cylindrical portion 312 extends from the outer peripheral end of the disc portion 311 toward the prime mover 2. The disc portion 311 and the cylindrical portion 312 are provided as a single member.

The cover hub 313 is fixed to the inner peripheral end of the disc portion 311. In the present preferred embodiment, the cover hub 313 is provided as a member separated from the disc portion 311. However, the cover hub 313 can be provided together with the disc portion 311 as a single member.

The cover hub 313 includes a first boss portion 313*a*, a first flange portion 313*b* and a protruding portion 313*c*. The first boss portion 313*a*, the first flange portion 313*b* and the protruding portion 313*c* are provided as a single member.

The first boss portion 313*a* is made in the shape of a cylinder including a spline hole. The input shaft 5 is spline-coupled to the first boss portion 313*a*. As shown in FIG. 2, the first boss portion 313*a* is rotatably supported by the torque converter casing 7 through a bearing member 102. Because of this, the first boss portion 313*a* axially extends from the first flange portion 313*b* to the opposite side of the prime mover 2.

As shown in FIG. 3, the first flange portion 313*b* extends radially outward from the first boss portion 313*a*. Detailedly, the first flange portion 313*b* extends radially outward from the prime mover 2-side end of the first boss portion 313*a*. The disc portion 311 is fixed to the outer peripheral end of the first flange portion 313*b*.

The protruding portion 313*c* axially extends from the first flange portion 313*b*. The protruding portion 313*c* extends toward the prime mover 2. The protruding portion 313*c* extends from the outer peripheral end of the first flange portion 313*b*. The protruding portion 313*c* has a cylindrical shape. The protruding portion 313*c* includes a plurality of through holes 313*d*. The hydraulic fluid is discharged from the torque converter 3 through the through holes 313*d*.

The impeller 32 is rotated unitarily with the cover 31. The impeller 32 is fixed to the cover 31. The impeller 32 includes an impeller shell 321, a plurality of impeller blades 322, an impeller hub 323 and a plurality of supply flow pathways 324.

The impeller shell 321 is fixed to the cover 31. The plural impeller blades 322 are attached to the inner surface of the impeller shell 321.

The impeller hub 323 is attached to the inner peripheral end of the impeller shell 321. It should be noted that in the present preferred embodiment, the impeller hub 323 is provided together with the impeller shell 321 as a single member but can be provided as a member separated from the impeller shell 321.

The impeller hub 323 includes a second boss portion 323*a* and a second flange portion 323*b*. The second boss portion 323*a* has a cylindrical shape and axially extends. The second boss portion 323*a* is rotatably supported by the torque converter casing 7 through a bearing member 103 (see FIG. 2). A stationary shaft 104 axially extends in the interior of the second boss portion 323*a*. It should be noted that the stationary shaft 104 has a cylindrical shape and the output shaft 6 axially extends in the interior of the stationary shaft 104. Besides, the stationary shaft 104 extends from, for instance, a reducer casing 42 or the torque converter casing 7. The stationary shaft 104 is non-rotatable.

The supply flow pathways 324 are provided in the impeller hub 323. Detailedly, the supply flow pathways 324 are provided in the second flange portion 323*b*. The supply flow pathways 324 extend radially outward from the inner peripheral surface of the impeller hub 323. Additionally, the supply flow pathways 324 are opened to the interior of a torus T. It should be noted that the torus T is a space enclosed by the impeller 32 and the turbine 33.

Figure 4:
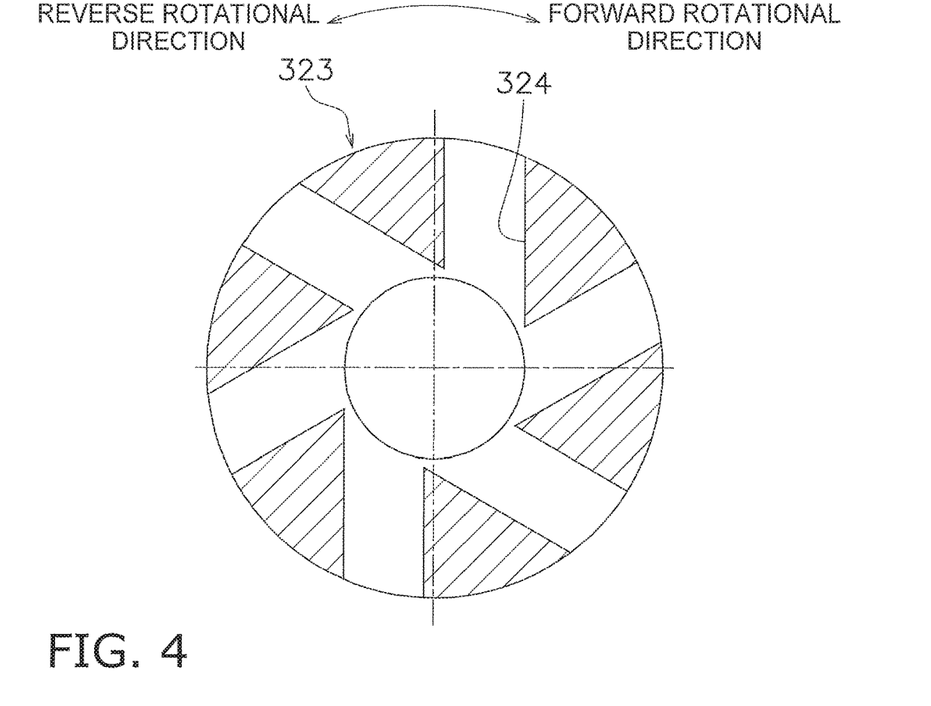
FIG. 4 is a cross-sectional view of a type of impeller hub.
Figure 5:
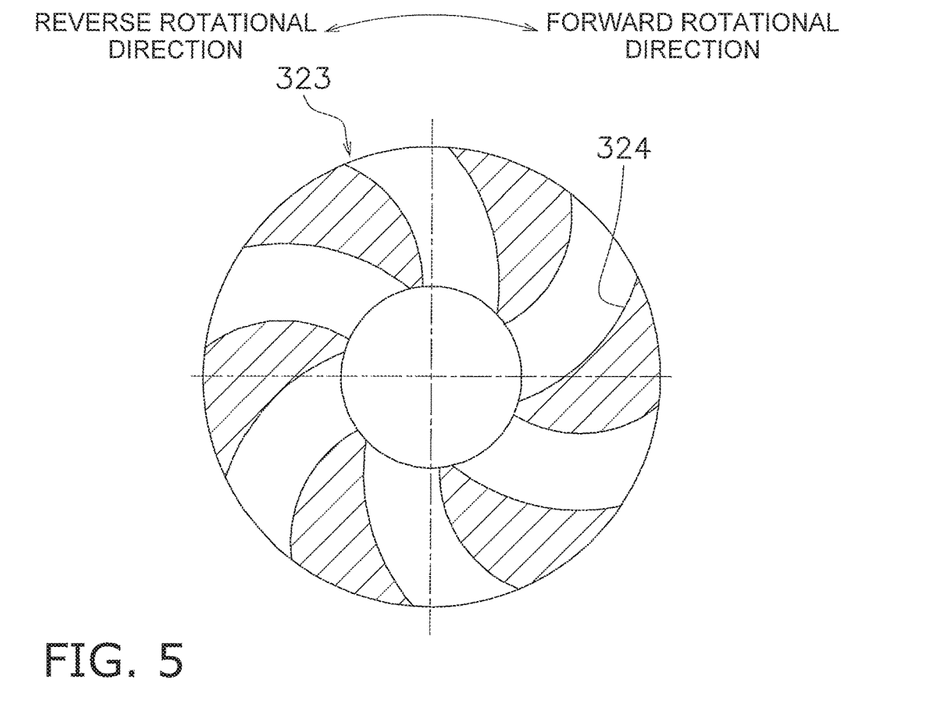
FIG. 5 is a cross-sectional view of another type of impeller hub.

The supply flow pathways 324 are axially closed. In other words, the supply flow pathways 324 are through holes radially extending in the impeller hub 323. As shown in FIG. 4, the supply flow pathways 324 extend in a radial shape. The supply flow pathways 324 slant opposite to a forward rotational direction, while extending radially outward. In other words, the supply flow pathways 324 slant in a reverse rotational direction (counterclockwise in FIG. 4), while extending radially outward. It should be noted that the extending shape of each supply flow pathway 324 is not limited to a straight shape. For example, as shown in FIG. 5, each supply flow pathway 324 can extend in a curved shape.

As shown in FIG. 3, the turbine 33 is disposed in opposition to the impeller 32. Detailedly, the turbine 33 is axially opposed to the impeller 32. The turbine 33 is a component to which a torque is transmitted from the impeller 32 through the hydraulic fluid.

The turbine 33 includes a turbine shell 331, a plurality of turbine blades 332 and a turbine hub 333. The turbine blades 332 are fixed to the inner surface of the turbine shell 331.

The turbine hub 333 is fixed to the inner peripheral end of the turbine shell 331. For example, the turbine hub 333 is fixed to the turbine shell 331 by at least one rivet. In the present preferred embodiment, the turbine hub 333 is provided as a member separated from the turbine shell 331. However, the turbine hub 333 can be provided together with the turbine shell 331 as a single member.

The output shaft 6 is attached to the turbine hub 333. Detailedly, the output shaft 6 is spline-coupled to the turbine hub 333. The turbine hub 333 is unitarily rotated with the output shaft 6.

The turbine hub 333 includes a third boss portion 333a and a third flange portion 333b. The third boss portion 333a and the third flange portion 333b are provided as a single member.

The third boss portion 333a has a cylindrical shape and includes a spline hole. The output shaft 6 is spline-coupled to the third boss portion 333a. The third boss portion 333a axially extends from the third flange portion 333b to the opposite side of the prime mover 2. In other words, the third boss portion 333a axially extends from the third flange portion 333b toward the cover hub 313.

The third boss portion 333a is disposed at a radial interval from the protruding portion 313c. In other words, the protruding portion 313c is disposed radially outside the third boss portion 333a. The first one-way clutch 35 is disposed between the third boss portion 333a and the protruding portion 313c. It should be noted that without installation of the first one-way clutch 35, the outer peripheral surface of the third boss portion 333a and the inner peripheral surface of the protruding portion 313c are opposed to each other.

A flow pathway is provided between the cover hub 313 and the distal end of the third boss portion 333a such that the hydraulic fluid flows therethrough. In the present preferred embodiment, the third boss portion 333a is provided with a plurality of cutouts 333c on the distal end thereof. The cutouts 333c radially extend on the distal end of the third boss portion 333a. The hydraulic fluid is discharged from the torque converter 3 through the cutouts 333c and the through holes 313d.

The third flange portion 333b extends radially outward from the third boss portion 333a. Detailedly, the third flange portion 333b extends radially outward from the prime mover 2-side end of the third boss portion 333a. The turbine shell 331 is fixed to the outer peripheral end of the third flange portion 333b by the at least one rivet or so forth.

The stator 34 is configured to regulate the flow of the hydraulic fluid (hydraulic oil) returning from the turbine 33 to the impeller 32. The stator 34 is rotatable about the rotational axis O. For example, the stator 34 is supported by the stationary shaft 104 through the second one-way clutch 36. The stator 34 is disposed axially between the impeller 32 and the turbine 33.

The stator 34 includes a stator carrier 341 having a disc shape and a plurality of stator blades 342 attached to the outer peripheral surface of the stator carrier 341.

The first one-way clutch 35 is disposed between the cover 31 and the turbine 33. The first one-way clutch 35 makes the cover 31 rotatable relative to the turbine 33 in the forward rotational direction. In other words, when the prime mover 2 is forwardly rotated to move the vehicle forward, the first one-way clutch 35 is configured such that the cover 31 is rotated relative to the turbine 33. Because of this, in forward movement of the vehicle, the first one-way clutch 35 does not transmit a torque from the cover 31 to the turbine 33.

By contrast, the first one-way clutch 35 makes the cover 31 rotate unitarily with the turbine 33 in the reverse rotational direction. In other words, when the prime mover 2 is reversely rotated to move the vehicle backward, the first one-way clutch 35 is configured such that the cover 31 is rotated unitarily with the turbine 33. Because of this, in backward movement of the vehicle, the first one-way clutch 35 transmits a torque from the cover 31 to the turbine 33.

The second one-way clutch 36 is disposed between the stationary shaft 104 and the stator 34. The second one-way clutch 36 is configured to make the stator 34 rotatable in the forward rotational direction. By contrast, the second one-way clutch 36 makes the stator 34 non-rotatable in the reverse rotational direction. The torque is transmitted from the impeller 32 to the turbine 33, while being amplified by the stator 34.

The centrifugal clutch 37 is attached to the turbine 33. The centrifugal clutch 37 is unitarily rotated with the turbine 33. The centrifugal clutch 37 is configured to couple the cover 31 and the turbine 33 to each other by a centrifugal force generated in rotation of the turbine 33. Detailedly, the centrifugal clutch 37 is configured to transmit the torque from the cover 31 to the turbine 33 when the rotational speed of the turbine 33 becomes greater than or equal to a predetermined value.

The centrifugal clutch 37 includes a plurality of centrifugal elements 371 and a plurality of friction materials 372. The friction materials 372 are attached to the outer peripheral surfaces of the centrifugal elements 371, respectively. The centrifugal elements 371 are disposed while being radially movable. It should be noted that the centrifugal elements 371 are disposed while being circumferentially immovable. Because of this, the centrifugal elements 371 are rotated together with the turbine 33 and are moved radially outward by centrifugal forces.

When the rotational speed of the turbine 33 becomes greater than or equal to the predetermined value, the centrifugal clutch 37 is configured such that the centrifugal elements 371 are moved radially outward and the friction materials 372 are engaged by friction with the inner peripheral surface of the cylindrical portion 312 of the cover 31. As a result, the centrifugal clutch 37 is turned to an on state, and the torque outputted from the cover 31 is transmitted to the turbine 33 through the centrifugal clutch 37. It should be noted that even when the centrifugal clutch 37 is turned to the on state, the hydraulic fluid is capable of flowing through the centrifugal clutch 37.

When the rotational speed of the turbine 33 becomes less than the predetermined value, the centrifugal elements 371 are moved radially inward, whereby the friction materials 372 and the inner peripheral surface of the cylindrical portion 312 of the cover 31, engaged by friction, are disengaged from each other. As a result, the centrifugal clutch 37 is turned to an off state, and the torque outputted from the cover 31 is not transmitted to the turbine 33 through the centrifugal clutch 37. In other words, the torque outputted from the cover 31 is transmitted to the impeller 32 and is then transmitted to the turbine 33 through the hydraulic fluid.

<Reducer 4>

As shown in FIG. 2, the reducer 4 is disposed axially between the prime mover 2 and the torque converter 3. The reducer 4 transmits a torque, outputted from the torque converter 3, to the drive wheel 101 side. Detailedly, the reducer 4 amplifies the torque outputted from the torque converter 3 and transmits the amplified torque to the drive wheel 101 side through a differential gear 109. It should be noted that the reducer 4 includes a plurality of gears 41 and the reducer casing 42 accommodating the respective gears 41. It should be also noted that one of the plural gears 41 is fixed to the output shaft 6. In the present preferred embodiment, one of the gears 41 is provided together with the output shaft 6 as a single member.

<Input Shaft 5>

The input shaft 5 extends from the prime mover 2. The input shaft 5 extends toward the torque converter 3. The rotational axis of the input shaft 5 is substantially matched with that of the prime mover 2 and that of the torque converter 3.

The input shaft 5 inputs the torque, outputted from the prime mover 2, to the torque converter 3. The input shaft 5 is attached at the distal end thereof to the cover hub 313 of the torque converter 3. The input shaft 5 is unitarily rotated with the rotor 23 of the prime mover 2. The input shaft 5 extends through the interior of the output shaft 6. The input shaft 5 is solid. The input shaft 5 includes a communicating pathway 51 in the distal end thereof. The communicating pathway 51 extends in the axial direction. Besides, the communicating pathway 51 is opened toward the first cooling flow pathway 9a.

<Output Shaft 6>

The output shaft 6 outputs the torque outputted from the torque converter 3. The output shaft 6 outputs the torque, outputted from the torque converter 3, to the reducer 4. The output shaft 6 extends from the torque converter 3 toward the prime mover 2.

The output shaft 6 has a cylindrical shape. The input shaft 5 extends through the interior of the output shaft 6. The output shaft 6 is attached at one end (the right end in FIG. 2) to the turbine 33 of the torque converter 3. On the other hand, the output shaft 6 is rotatably supported at the other end (the left end in FIG. 2) by the reducer casing 42 through a bearing member 105.

<Torque Converter Casing 7>

Figure 6:
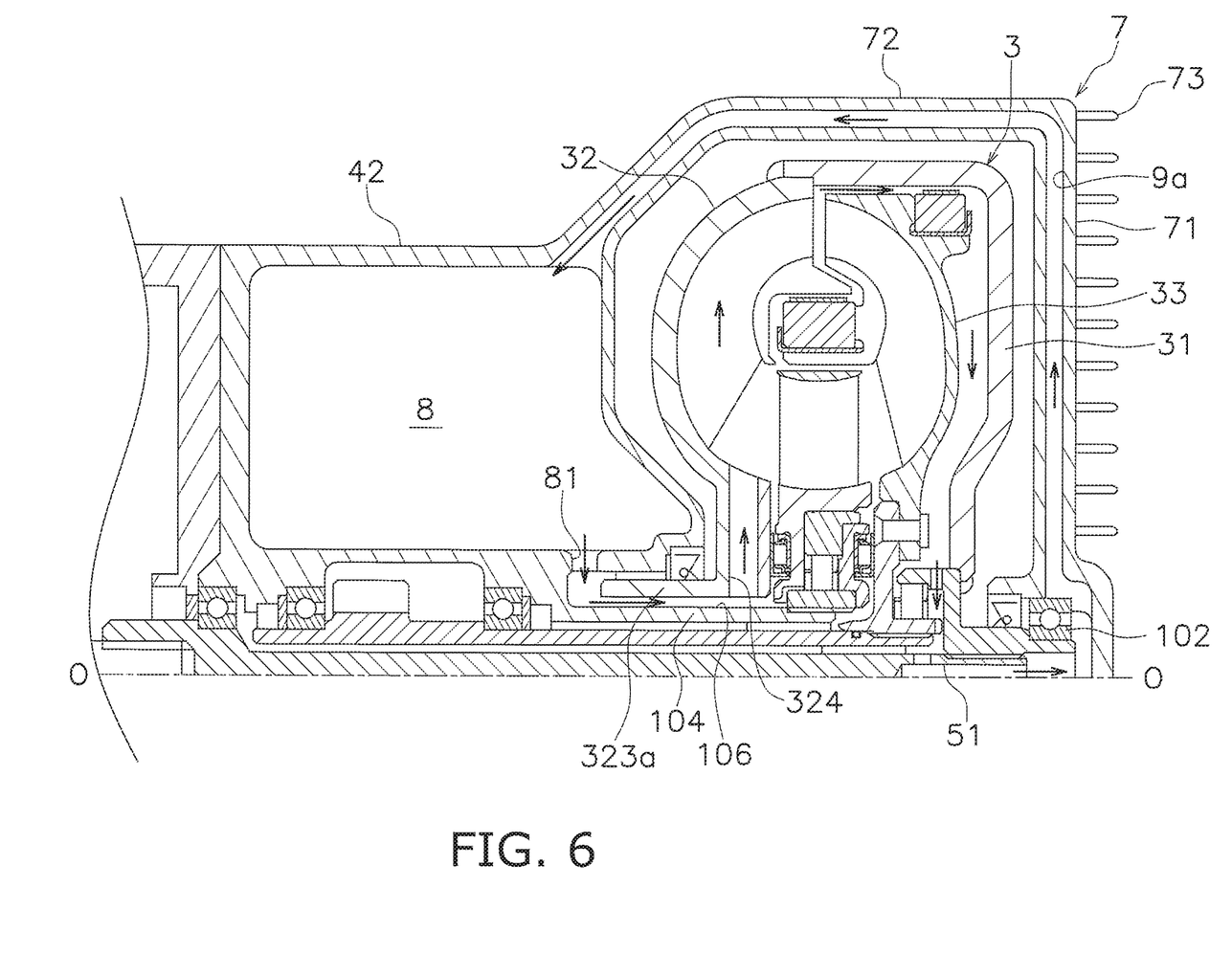
FIG. 6 is a cross-sectional view of the drive unit shown for indicating a first cooling flow pathway.

As shown in FIG. 6, the torque converter casing 7 accommodates the torque converter 3. In the present preferred embodiment, the torque converter casing 7 is provided together with the reducer casing 42 as a single member. However, the torque converter casing 7 can be provided as a member separated from the reducer casing 42.

The torque converter casing 7 includes a side wall portion 71, an outer wall portion 72 and a plurality of heat dissipation fins 73. The sidewall portion 71 is disposed in opposition to the cover 31 of the torque converter 3. The sidewall portion 71 is disposed orthogonal to the rotational axis O.

The torque converter 3 is disposed on one axial side (the left side in FIG. 6) of the sidewall portion 71. On the other hand, the sidewall portion 71 makes contact at the other side (the right lateral surface in FIG. 6) with external air. In other words, a member, functioning as a heat source, is not disposed on the other side of the sidewall portion 71.

The cover 31 is rotatably attached to the middle part of the sidewall portion 71 through the bearing member 102. The sidewall portion 71 is made of a material, having a high specific heat and a high thermal conductivity, so as to quickly absorb a large amount of heat from the hydraulic fluid flowing through the first cooling flow pathway 9a and release the absorbed heat to the atmosphere. For example, the sidewall portion 71 is made of magnesium, aluminum or so forth.

The outer wall portion 72 is disposed in opposition to the outer peripheral surface of the torque converter 3. The outer wall portion 72 is provided together with the sidewall portion 71 as a single member. However, the outer wall portion 72 can be provided as a member separated from the sidewall portion 71. The outer wall portion 72 extends toward the prime mover 2 from the outer peripheral end of the sidewall portion 71. The outer wall portion 72 extends substantially in parallel to the rotational axis O. It should be noted that the distal end (the prime mover 2-side end) of the outer wall portion 72 slants radially inward. The outer wall portion 72 can be made of a similar material to the sidewall portion 71.

The heat dissipation fins 73 are provided on the sidewall portion 71. The heat dissipation fins 73 extend from the sidewall portion 71 to the opposite side (rightward in FIG. 6) of the torque converter 3. The heat dissipation fins 73 are attached to the sidewall portion 71 in order to efficiently dissipate the heat of the hydraulic fluid flowing through the first cooling flow pathway 9a. The thermal conductivity of the heat dissipation fins 73 is preferably set to be equivalent to or higher than that of the sidewall portion 71 but is not particularly limited to this setting. The heat dissipation fins 73 are made of, for instance, magnesium, aluminum, copper or so forth.

<First Cooling Flow Pathway 9a>

The first cooling flow pathway 9a is a flow pathway for cooling the hydraulic fluid discharged from the torque converter 3. The first cooling flow pathway 9a extends in the interior of the torque converter casing 7. In the present preferred embodiment, the first cooling flow pathway 9a is provided only in the upper half of the torque converter casing 7 (see FIG. 2).

The first cooling flow pathway 9a extends from the middle part to the outer peripheral part in the interior of the sidewall portion 71 and axially extends therefrom beyond the torque converter 3 in the interior of the outer wall portion 72. The first cooling flow pathway 9a is communicated with the hydraulic fluid sump 8.

Figure 7:
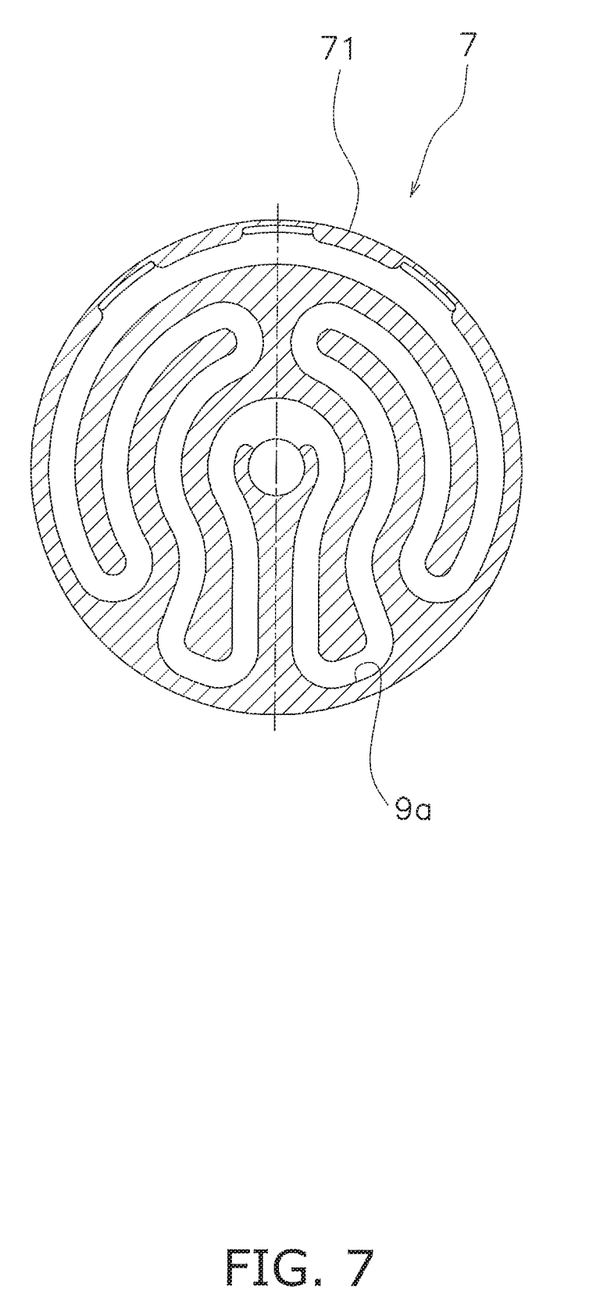
FIG. 7 is a cross-sectional view of a sidewall portion of a type of cover.
Figure 8:
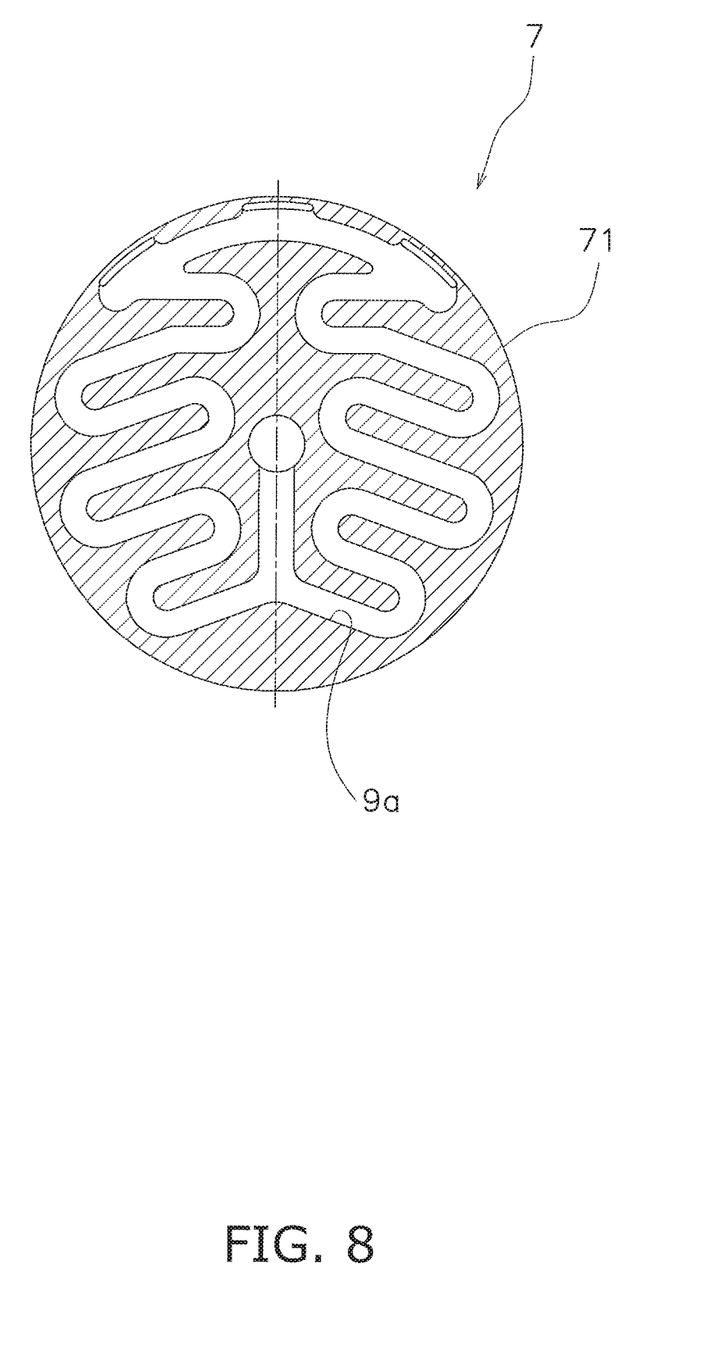
FIG. 8 is a cross-sectional view of a sidewall portion of another type of cover.

As shown in FIG. 7 or FIG. 8, the first cooling flow pathway 9a includes a plurality of paths in the interior of the sidewall portion 71. In the present preferred embodiment, the first cooling flow pathway 9a is divided into two paths in the interior of the sidewall portion 71. In the interior of the sidewall portion 71, the first cooling flow pathway 9a extends from the middle part to the outer peripheral part not in a straight shape but in a winding shape.

The first cooling flow pathway 9a can include a plurality of paths in the interior of the outer wall portion 72 as well. In the present preferred embodiment, the first cooling flow pathway 9a is divided into, for instance, three paths in the interior of the outer wall portion 72. The first cooling flow pathway 9a axially extends in a straight shape in the interior of the outer wall portion 72. Alternatively, the first cooling flow pathway 9a can extend in a winding shape in the interior of the outer wall portion 72.

[Hydraulic Fluid Sump 8]

As shown in FIG. 6, the hydraulic fluid sump 8 is disposed to axially interpose the torque converter 3 together with the sidewall portion 71 therebetween. In other words, the hydraulic fluid sump 8, the torque converter 3 and the sidewall portion 71 are axially aligned in this order. The hydraulic fluid sump 8 is disposed in the interior of the reducer casing 42. The hydraulic fluid sump 8 is disposed above the rotational axis O.

The hydraulic fluid sump 8 contains the hydraulic fluid to be supplied to the torque converter 3 in the interior thereof. The hydraulic fluid sump 8 is provided with a supply port 81 in the bottom surface thereof. The hydraulic fluid, discharged from the supply port 81, is supplied to the torque converter 3 through a flow pathway 106 provided between the stationary shaft 104 and the second boss portion 323a of the impeller hub 323.

Specifically, a centrifugal force is generated in rotation of the impeller 32 of the torque converter 3, whereby the hydraulic fluid residing in the interior of the flow pathway 106 is supplied to the interior of the torus T through the supply flow pathways 324. Then, the hydraulic fluid, discharged from the torque converter 3, flows to the first cooling flow pathway 9a through the communicating pathway 51. Subsequently, the hydraulic fluid, cooled while flowing through the first cooling flow pathway 9a, is returned to the hydraulic fluid sump 8.

[Modifications]

One preferred embodiment of the present invention has been explained above. However, the present invention is not limited to the above, and a variety of changes can be made without departing from the gist of the present invention.

Modification 1

Figure 9:
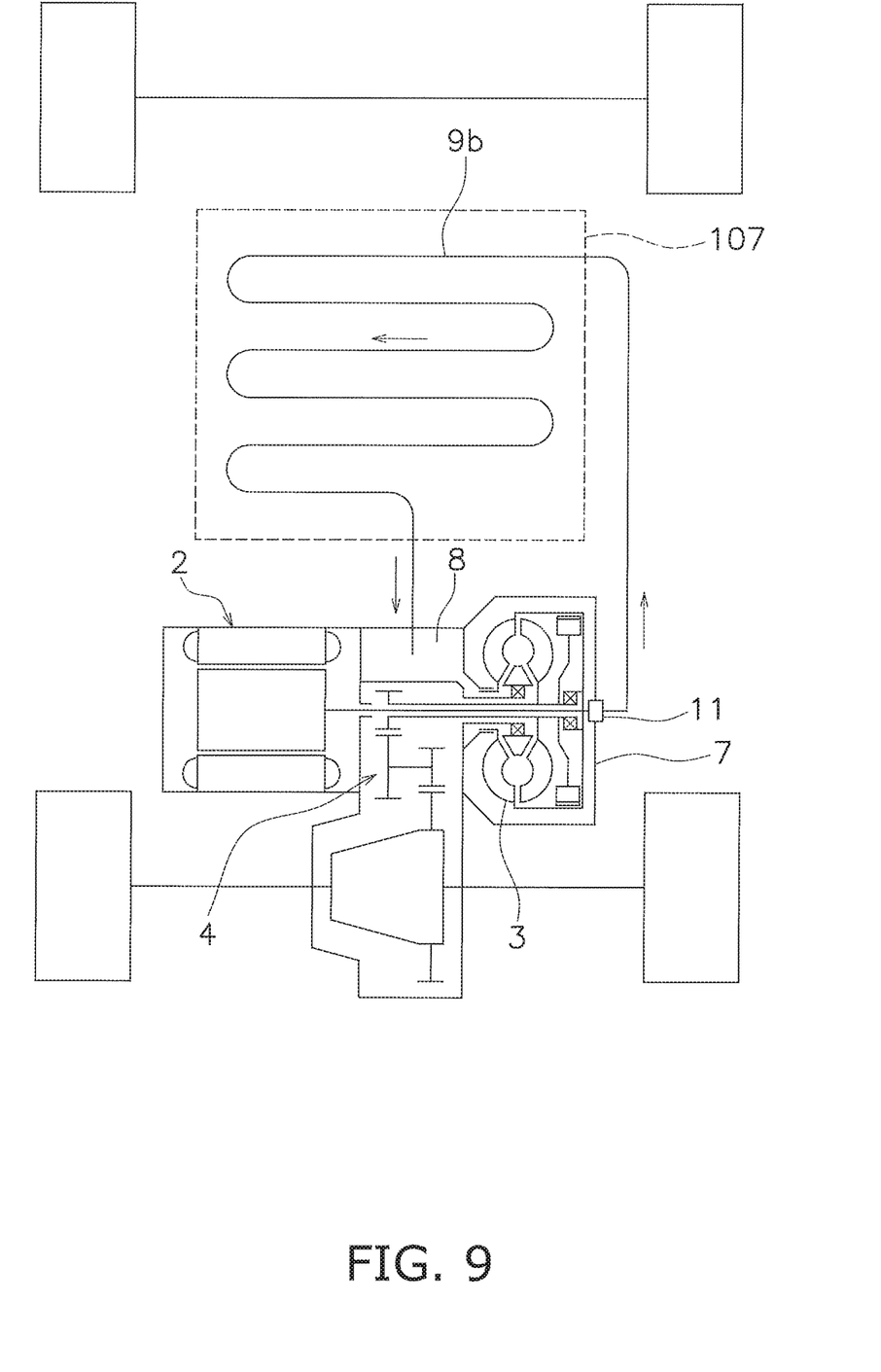
FIG. 9 is a schematic diagram of a drive unit according to a modification.

For example, as shown in FIG. 9, the torque converter unit can further include a second cooling flow pathway 9b. The second cooling flow pathway 9b extends through the interior of a compartment 107 of a vehicle into which the torque converter unit is installed. The hydraulic fluid, discharged from the torque converter 3, flows through the second cooling flow pathway 9b. The hydraulic fluid, flowing through the second cooling flow pathway 9b, is cooled while dissipating heat thereof into the compartment 107.

The hydraulic fluid is supplied to the second cooling flow pathway 9b from the communicating pathway 51. Additionally, the hydraulic fluid is returned to the hydraulic fluid sump 8 through the second cooling flow pathway 9b.

The torque converter unit further includes a selector mechanism 11. The selector mechanism 11 is configured to select either the first cooling flow pathway 9a or the second cooling flow pathway 9b as a cooling flow pathway for supplying the hydraulic fluid discharged from the torque converter 3.

Modification 2

Figure 10:
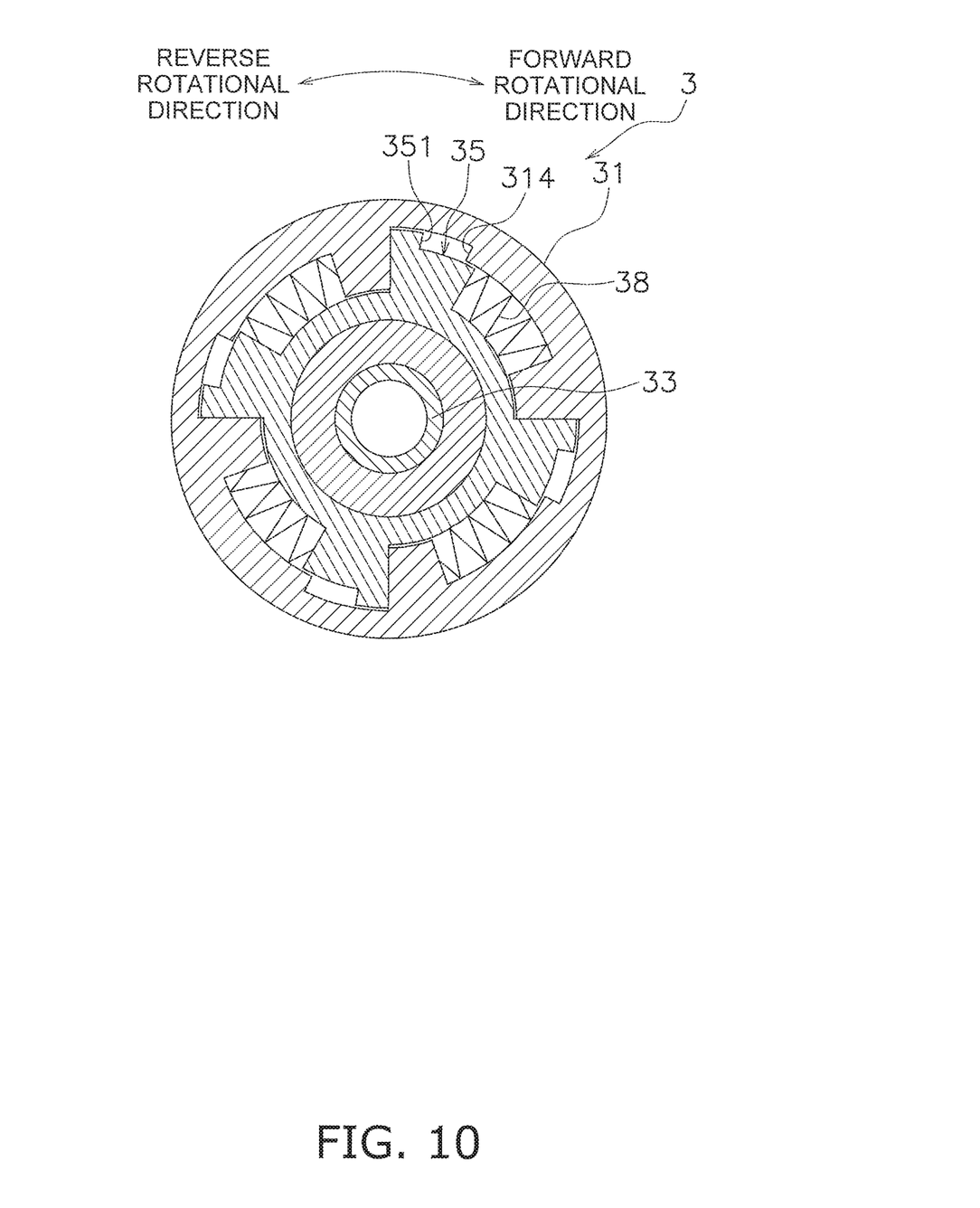
FIG. 10 is a schematic diagram of a first one-way clutch according to another modification.

As shown in FIG. 10, the torque converter 3 can further include a plurality of elastic members 38. The elastic members 38 are disposed circumferentially between the first one-way clutch 35 and the cover 31. The elastic members 38 transmit a torque, applied in the reverse rotational direction from the cover 31, to the first one-way clutch 35. It should be noted that, when the cover 31 is rotated with respect to the first one-way clutch 35 by more than a predetermined angle in the reverse rotational direction, first stopper surfaces 314 of the cover 31 make contact with second stopper surfaces 351 of the first one-way clutch 35. As a result, the torque, applied from the cover 31, is directly transmitted to the first one-way clutch 35.

In reverse rotation as described above, the torque, applied from the cover 31, is firstly transmitted to the first one-way clutch 35 through the elastic members 38, whereby massive and sudden torque transmission can be eased.

It should be noted that the elastic members 38 can be disposed circumferentially between the first one-way clutch 35 and the turbine 33. In this case, the elastic members 38 transmit a torque, applied from the first one-way clutch 35 in the reverse rotational direction, to the turbine 33.

Modification 3

Figure 11:
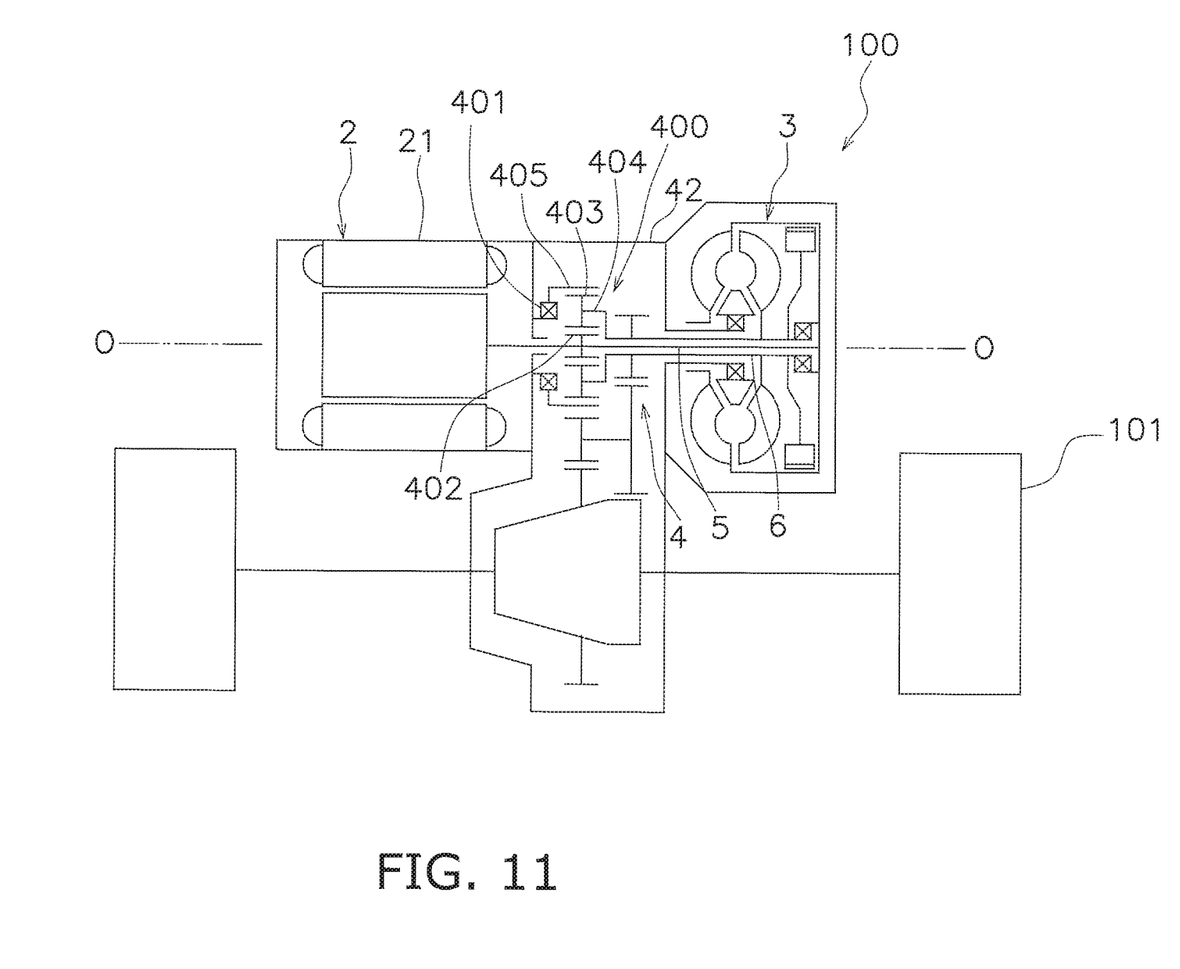
FIG. 11 is a schematic diagram of a drive unit according to yet another modification.

As shown in FIG. 11, the present power transmission mechanism can include a planetary gear mechanism 400 and a clutch 401. The planetary gear mechanism 400 includes a sun gear 402, a plurality of planet gears 403, a planet carrier 404 and a ring gear 405.

The sun gear 402 is attached to the input shaft 5. The sun gear 402 is unitarily rotated with the input shaft 5. The planet carrier 404 is attached to the output shaft 6. The planet carrier 404 is unitarily rotated with the output shaft 6.

The clutch 401 is disposed between a non-rotatable member (e.g., the reducer casing 42 or the prime mover casing 21) and the ring gear 405. Besides, the clutch 401 is configured to brake rotation of the ring gear 405.

The clutch 401 is, for instance, a one-way clutch. The clutch 401 makes the ring gear 405 rotatable in forward rotation of the input shaft 5 and the output shaft 6. By contrast, the clutch 401 makes the ring gear 405 non-rotatable in reverse rotation of the input shaft 5 and the output shaft 6.

According to this configuration, when the input shaft 5 and the output shaft 6 are forwardly rotated, in other words, when the vehicle is forwardly moved, the ring gear 405 is being rotated without being fixed, whereby an amplifying action does not work in the planetary gear mechanism 400. Because of this, the torque, outputted from the prime mover 2, is transmitted to the drive wheels 101 through the torque converter 3 and the reducer 4.

By contrast, when the input shaft 5 and the output shaft 6 are reversely rotated, in other words, when the vehicle is backwardly moved, the clutch 401 makes the ring gear 405 non-rotatable, whereby the amplifying function works in the planetary gear mechanism 400. Because of this, the torque, outputted from the prime mover 2, is transmitted to the drive wheels 101 through the reducer 4, while being amplified by the planetary gear mechanism 400.

REFERENCE SIGNS LIST

3 Torque converter
31 Cover
32 Impeller
33 Turbine
34 Stator
35 First one-way clutch
36 Second one-way clutch
38 Elastic member

What is claimed is:

1. A torque converter comprising:
   a cover to which a torque outputted from an electric motor is inputted;
   an impeller unitarily rotated with the cover, the impeller being axially disposed between the cover and the electric motor;

a turbine opposed to the impeller;

a stator disposed between the impeller and the turbine;

an input shaft extending in an axial direction, the electric motor being attached to a first end of the input shaft, the cover being attached to a second end of the input shaft; and a first one-way clutch configured to make the cover rotatable relative to the turbine in a forward rotational direction of the cover, the first one-way clutch further configured to rotate the cover unitarily with the turbine in a reverse rotational direction of the cover.

2. The torque converter according to claim 1, further comprising:

a second one-way clutch configured to make the stator rotatable in the forward rotational direction, the second one-way clutch further configured to make the stator non-rotatable in the reverse rotational direction.

3. The torque converter according to claim 1, further comprising:

an elastic member configured to transmit the torque outputted from the cover therethrough to the first one-way clutch in the reverse rotational direction.

4. The torque converter according to claim 1, further comprising:

an elastic member configured to transmit the torque outputted from the first one-way clutch therethrough to the turbine in the reverse rotational direction.

\* \* \* \* \*